(12) United States Patent
Jones et al.

(10) Patent No.: US 10,951,501 B1
(45) Date of Patent: Mar. 16, 2021

(54) MONITORING AVAILABILITY OF CONTENT DELIVERY NETWORKS

(71) Applicant: Amazon Technologies, Inc., Seattle, WA (US)

(72) Inventors: Harvo Reyzell Jones, Lake Forest Park, WA (US); Mykhailo Ponomarenko, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 772 days.

(21) Appl. No.: 14/542,349

(22) Filed: Nov. 14, 2014

(51) Int. Cl.
| | | |
|---|---|---|
| *G06F 15/173* | (2006.01) | |
| *H04L 12/26* | (2006.01) | |
| *H04L 29/08* | (2006.01) | |
| *H04L 12/911* | (2013.01) | |

(52) U.S. Cl.
CPC ......... *H04L 43/0805* (2013.01); *H04L 47/70* (2013.01); *H04L 67/2842* (2013.01)

(58) Field of Classification Search
CPC .................................................. H04L 67/2842
See application file for complete search history.

(56) References Cited

U.S. PATENT DOCUMENTS

| | | | | |
|---|---|---|---|---|
| 7,865,584 B2* | 1/2011 | Grossner | ............. | H04L 12/2602 709/203 |
| 7,912,978 B2* | 3/2011 | Swildens | ................ | H04L 12/14 370/229 |
| 8,195,788 B2* | 6/2012 | Maggi | ..................... | H04L 29/06 709/223 |
| 8,626,910 B1* | 1/2014 | Lientz | ................. | H04L 41/0896 702/186 |
| 8,825,608 B2* | 9/2014 | Lipstone | ........... | G06F 17/30035 707/688 |
| 8,914,814 B1* | 12/2014 | Middleton | .............. | G06F 9/541 718/104 |
| 9,391,856 B2* | 7/2016 | Kazerani | ................. | H04L 43/08 |
| 2010/0220622 A1* | 9/2010 | Wei | ..................... | H04L 41/0896 370/252 |
| 2011/0078327 A1* | 3/2011 | Li | ..................... | H04L 29/12066 709/238 |

(Continued)

*Primary Examiner* — Umar Cheema
*Assistant Examiner* — Tesfu N Mekonen
(74) *Attorney, Agent, or Firm* — Knobbe, Martens, Olson & Bear, LLP (57) ABSTRACT

A computer implemented availability checking system and method is provided for use with a service provider configured to communicate with one or more client devices and with a content provider. The system includes a computer storage device operative to store an availability data store comprising a list of a plurality of potential endpoints of the service provider and a corresponding plurality of availability information for the plurality of potential endpoints. The plurality of potential endpoints is distributed across a plurality of resource cache components. The system further includes an availability query component operative to transmit a plurality of queries to the plurality of potential endpoints and to receive a plurality of responses from the plurality of potential endpoints. The system further includes an availability analysis component operative to analyze the plurality of responses, to generate the plurality of availability information, and to update the availability data store.

18 Claims, 4 Drawing Sheets

(56) References Cited

U.S. PATENT DOCUMENTS

| | | | |
|---|---|---|---|
| 2012/0089700 A1* | 4/2012 | Safruti | H04L 67/2842 709/217 |
| 2013/0041972 A1* | 2/2013 | Field | H04L 29/08729 709/213 |
| 2013/0304864 A1* | 11/2013 | Cadwell | H04L 67/1008 709/218 |
| 2014/0173052 A1* | 6/2014 | Newton | H04L 67/289 709/219 |
| 2015/0127765 A1* | 5/2015 | Bergman | H04L 67/2842 709/213 |
| 2015/0180992 A1* | 6/2015 | Thibeault | H04L 67/24 709/201 |
| 2016/0065602 A1* | 3/2016 | Serban | H04L 63/1416 726/23 |

* cited by examiner

MONITORING AVAILABILITY OF CONTENT DELIVERY NETWORKS

BACKGROUND

Generally described, computing devices and communication networks can be utilized to exchange information. In a common application, a device can request content from another device via the communication network. For example, a user at a personal computing device can utilize a software browser application to request a Web page from a server device via the Internet. For another example, a user of a content providing service can utilize a display device (e.g., television, computer, mobile device, smartphone, tablet) to request content (e.g., an audio presentation, video presentation, audiovisual presentation, movie, television show, video, podcast) to be streamed from a server device via the Internet to the display device. In such embodiments, the user computing device or display device can be referred to as a client device and the server device can be referred to as a content provider.

Content providers are generally motivated to provide requested content to client devices often with consideration of efficient transmission of the requested content to the client device and/or consideration of a cost associated with the transmission of the content. For larger scale implementations, a content provider may receive content requests from a high volume of client devices which can place a strain on the content provider's computing resources. Additionally, the content requested by the client devices may have a number of components, which can further place additional strain on the content provider's computing resources.

With reference to an illustrative example, content to be streamed to the display device to be presented to the user may be identified by one or more embedded resource identifiers, such as uniform resource locators ("URLs"). In turn, software on the client devices typically processes embedded resource identifiers to generate requests for the content. Often, the resource identifiers reference a computing device associated with the content provider such that the client device would transmit the request for the content to the referenced content provider computing device. Accordingly, in order to satisfy a content request, the content provider would provide client devices data associated with the content.

Some content providers attempt to facilitate the delivery of requested content through the utilization of a content delivery network ("CDN") service provider. A CDN server provider typically maintains a number of computing devices in a communication network that can maintain content from various content providers. In turn, content providers can instruct, or otherwise suggest to, client devices to request some, or all, of the content provider's content from the CDN service provider's computing devices.

With reference to the previous illustrative example, the content provider can leverage a CDN service provider with the modification or substitution of resource identifiers associated with the embedded resources. Specifically, the resource identifiers can reference a computing device associated with the CDN service provider such that the client device would transmit the request for the additional resources to the referenced CDN service provider computing device. Typically, the content provider facilitates the utilization of a CDN provider by including CDN-provider specific resources identifiers in requested content. This approach generally corresponds to an "offline" process implemented by the content provider in advance of receipt of a request for the original content from the client devices. Accordingly, modifications to resource identifiers, such as to provide alternative resources identifiers for the same CDN service provider, to provide additional information utilized by CDN service providers in processing the request for content or to identify alternative CDN service providers, can become inefficient as they typically require implementation of the offline process of the content provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to managing components of a content delivery network ("CDN") configured to respond to resource requests from a client device. Specifically, aspects of the disclosure will be described with monitoring the availability of a plurality of point of presence ("POP") locations having at least one resource cache component comprising a plurality of cache servers organized in a cache server hierarchy.

Although various aspects of the disclosure will be described with regard to illustrative examples and embodiments, one skilled in the art will appreciate that the disclosed embodiments and examples should not be construed as limiting.

Figure 1:
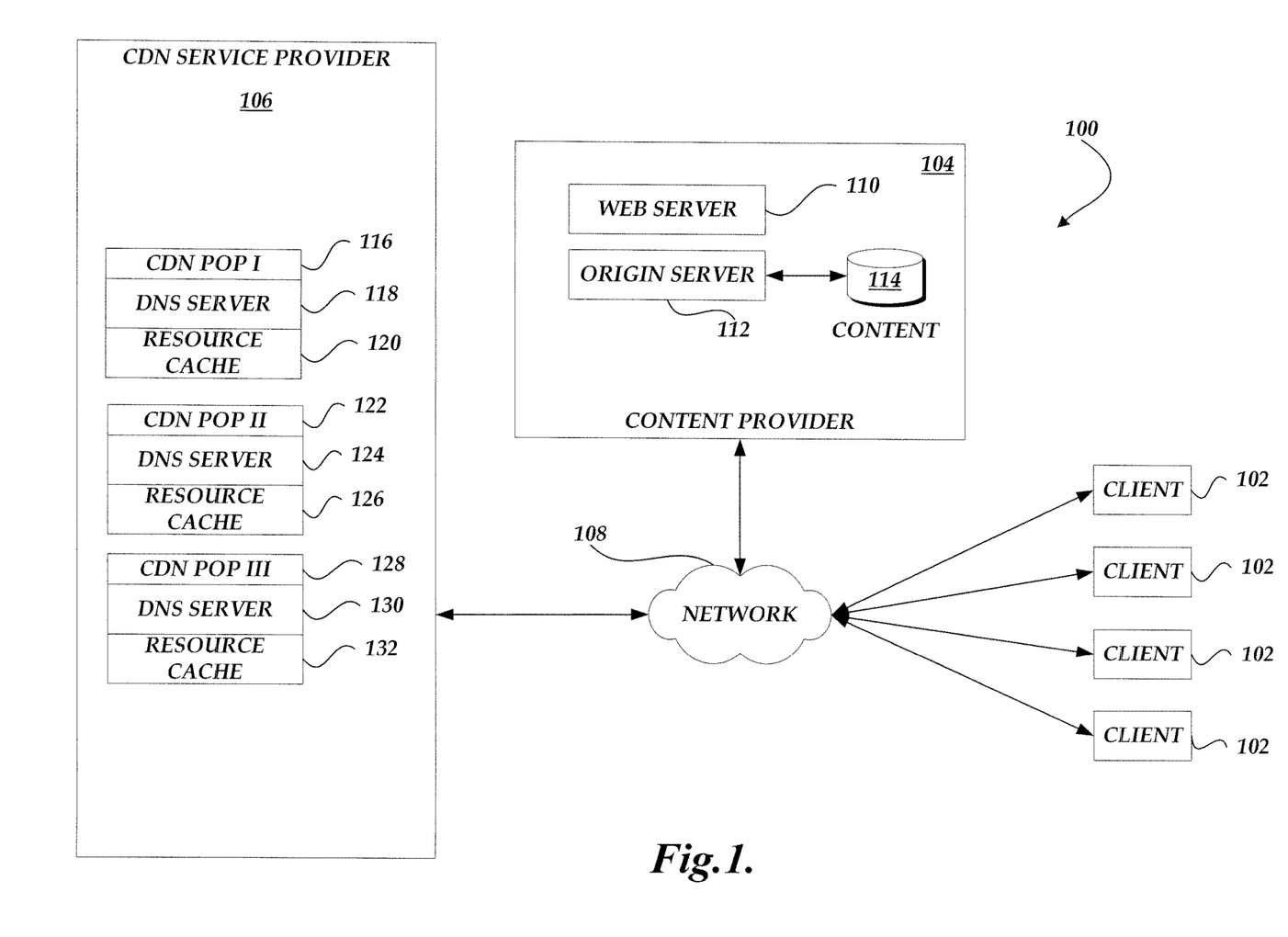
FIG. 1 is a block diagram illustrative of an example content delivery environment compatible with certain embodiments described herein, the example content delivery environment including a number of client devices, content provider, a content delivery network service provider, and a network computing and storage provider.

FIG. 1 is a block diagram illustrative of an example content delivery environment 100 for the management and processing of content requests, the example content delivery environment compatible with certain embodiments described herein. As illustrated in FIG. 1, the content delivery environment 100 includes a number of client devices 102 (generally referred to as clients) for requesting content from a plurality of providers including content providers 104 and CDN service providers 106. In an illustrative embodiment, the client devices 102 can correspond to a wide variety of devices including personal computing devices, laptop computing devices, hand-held computing devices, terminal computing devices, mobile devices (e.g., smartphones, tablets), wireless devices, various electronic devices (e.g., televisions) and appliances, and the like. In an illustrative embodiment, the client devices 102 include necessary hardware and software components for establishing communications over a communication network 108, such as a wide area network or local area network. For example, the client devices 102 may be equipped with networking equipment and browser software applications that facilitate communications via the Internet or an intranet.

As also illustrated in FIG. 1, the content delivery environment 100 can also include a content provider 104 configured to communicate with the one or more client devices 102 via the communication network 108. The content provider 104 illustrated in FIG. 1 comprises a logical association of one or more computing devices associated with the content provider. By way of example, the content provider 104 can include web server components 110 corresponding to one or more server computing devices for obtaining and processing requests for content from the client devices 102. The content provider 104 can further comprise an origin server component 112 and associated storage component 114 corresponding to one or more computing devices for obtaining and processing requests for network resources from the CDN service provider 106.

One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client device DNS queries corresponding to a domain of the content provider 104 (e.g., return an IP address responsive to the DNS query). A DNS name server component is considered to be authoritative to a DNS query if the DNS name server can completely resolve the query by providing a responsive IP address. Additionally, the content provider 104 may omit some of the components illustrated in FIG. 1, such as the origin server 112 or provide content to client computing devices 102 via components other than a web server 110.

With continued reference to FIG. 1, the content delivery environment 100 can further include a CDN service provider 106 configured to communicate with the one or more client devices 102 and with the content provider 104 via the communication network 108. The CDN service provider 106 illustrated in FIG. 1 comprises a logical association of one or more computing devices associated with the CDN service provider 106. Specifically, the CDN service provider 106 can comprise a number of Point of Presence ("POP") locations 116, 120, 124, which also can be generally referred to as Point of Delivery locations or "PODs," that correspond to nodes on the communication network 108. Each CDN POP 116, 120, 124 also comprises at least one resource cache component 118, 122, 126 having a plurality of cache server computer devices organized in a cache server hierarchy.

In an illustrative embodiment, although the CDN POPs 116, 120, 124 are illustrated in FIG. 1 as logically associated with the CDN service provider 106, the CDN POPs can be geographically distributed throughout the communication network 108 in a manner to best serve various demographics of client devices 102. Additionally, one skilled in the relevant art will appreciate that the CDN service provider 106 can be associated with various additional computing resources, such as additional computing devices for administration of content and resources, and the like. Still further, although the resource cache components 118, 122, 126 are discussed as being associated with the CDN service provider 106, one skilled in the relevant art will appreciate that the resource cache components 118, 122, 126 may be provided different service providers, independently or on behalf of content provider 104 or CDN server provider 106.

The resource cache components 118, 122, 126 may include hardware or software components for tracking the expiration of resources stored on behalf of one or more various content providers 104. In an embodiment, the expiration tracking components may assign an expiration time (e.g., time to life) to at least a portion of the resources stored within their respective resource cache component and provided to other resource cache components with the cache server hierarchy. In another embodiment, the expiration tracking components can monitor a residence time during which resources are stored by their resource cache component. The expiration time and residence time may be employed by the resource cache components 118, 122, 126 for expiring stored resources.

Figure 2:
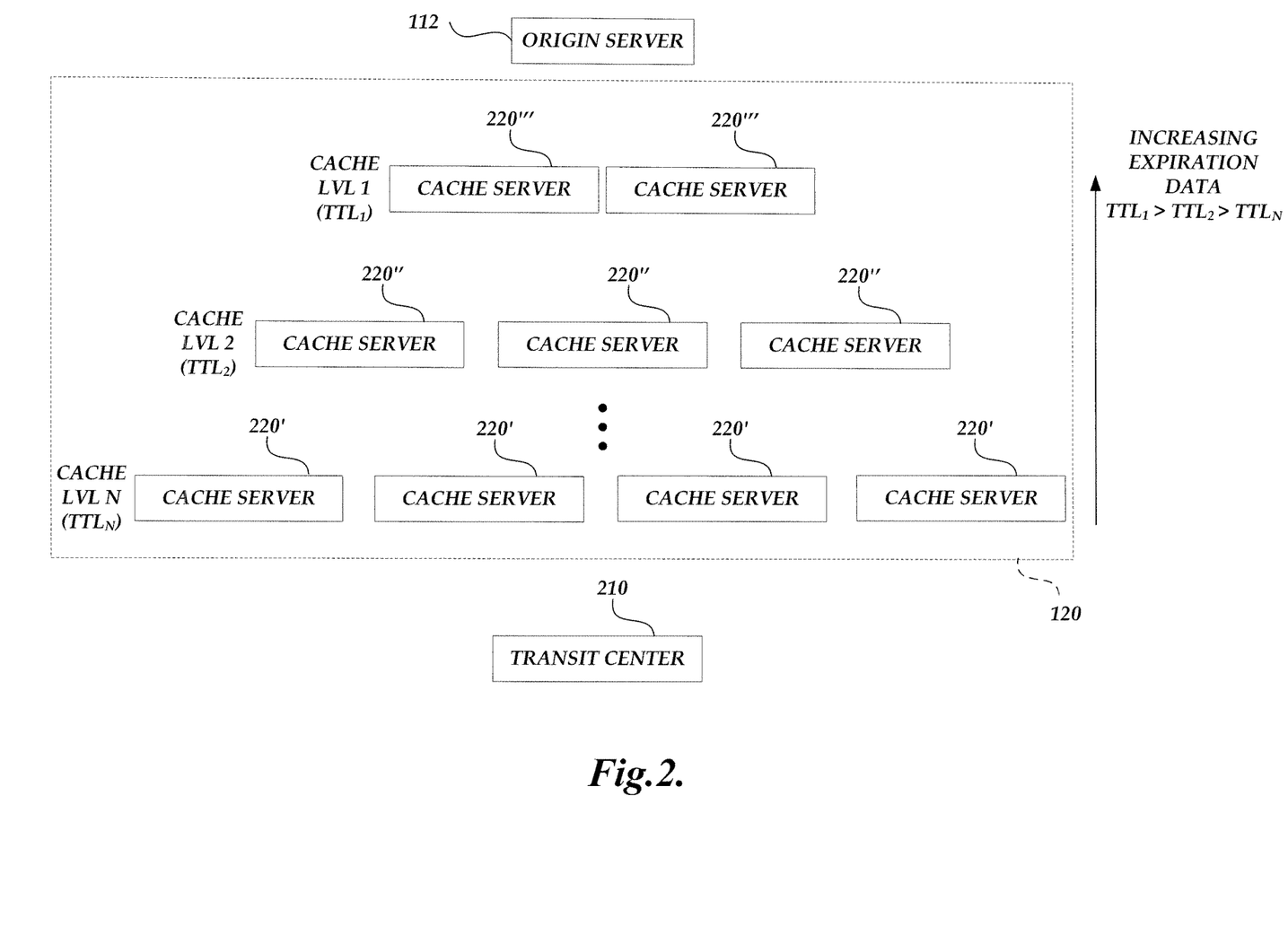
FIG. 2 schematically illustrates an example cache server hierarchy of a resource cache component compatible with certain embodiments described herein.

FIG. 2 schematically illustrates an example cache server hierarchy of a resource cache component 118 in accordance with certain embodiments described herein. The resource cache component 118 can be configured to process requests for resources and to transmit the requested resource to the client device 102. The resource cache component 118 is configured to communicate to a request processing component 210 of the CDN service provider 106 and comprises a plurality of cache servers 220 configured to store resources from content providers 104 and to transmit various requested resources to various client devices 102.

The request processing component 210 can comprise a plurality of routers (e.g., border routers) that can be configured to provide connectivity to external devices, to other request processing component 210, and to the cache servers 220 of one or more of the resource cache components 118. In certain embodiments, the request processing component 210 can be configured to provide a low-cost aggregation point for multiple CDN POPs (e.g., PODs, metro-sites) within a metropolitan area (e.g., CDN POPs 116, 120, 124). The request processing component 210 can be configured to serve as uplinks for the CDN POPs, to provide interconnection to other request processing component 210 of the CDN POPs, and to uplink into the border routers to provide Internet and border backbone connectivity. The cache servers 220 can comprise endpoints (e.g., hosts, network interface controllers or NICs) that are operationally coupled to the communication network 108 (e.g., via the request processing component 210).

In certain embodiments, the cache servers 220 of each resource cache component 118 may be logically organized in a cache server hierarchy. For example, in the example cache server hierarchy of FIG. 2, the resource cache component 118 comprises a plurality of cache servers 220 (which for clarity, will be referred to as cache servers 220', 220", 220''', etc.) that are logically organized in levels. The cache servers 220 located closest to client devices 102 (e.g., edge cache server 220') populate the lower levels of the cache server hierarchy and the cache servers 220 located further from the client devices 102 (e.g., cache servers 220", 220''') populate the higher levels of the cache server hierarchy.

Cache servers 220 residing on the same logical level (e.g., the four cache servers 220', the three cache servers 220", or the two cache servers 220''') can be referred to as peers of one another. Cache servers 220 residing at a higher logical level than another cache server can be referred to as hierarchically superior or parent cache servers of the other cache server (e.g., cache servers 220" are hierarchically superior or parent cache servers of each of cache servers 220', and cache servers 220''' are hierarchically superior or parent cache servers of each of cache servers 220'' and each of cache servers 220'). Cache servers 220 residing at a lower logical level than another cache server can be referred to as hierarchically inferior or child cache servers of the other cache server (e.g., cache servers 220'' are hierarchically inferior or child cache servers of each of cache servers 220''', and cache servers 220' are hierarchically inferior or child cache servers of each of cache servers 220''' and each of cache servers 220''). The origin server 112 of the content provider 104 can be at the top of the hierarchy, as any resource to be maintained by one or more cache servers 220 of the resource cache component hierarchy may ultimately retrieved from the origin server 112, in the event that the resource is not maintained by a peer or parent cache server. The concepts of peer cache servers, hierarchically superior cache servers, and hierarchically inferior cache servers can apply to cache servers 220 across multiple resource cache components 118, 122, 126 and across multiple CDN POPs 116, 120, 126. For example, a cache server 220'' of one resource cache component 118 of one CDN POP 116 can be considered to be a peer of a cache server 220'' of another resource cache component 122 of CDN POP 120, can be considered to be hierarchically superior to a cache server 220' of another resource cache component 122 of CDN POP 120, and can be considered to be hierarchically inferior to a cache server 220''' of another resource cache component 122 of CDN POP 120. As described more fully below, a cache miss on one level cache server 220' of one resource cache component 118 of one CDN POP 116 can result in a request to another cache server (e.g., a hierarchically superior cache server 220'' at the same resource cache component 118 of the same CDN POP 116, a hierarchically superior cache server 220'' at a different resource cache component 122 of a different CDN POP 120, an origin server 112, a peer cache server 220' of the same resource cache component 118 of the same CDN POP 116, a peer cache server 220' at a different resource cache component 122 of a different CDN POP 120, a hierarchically inferior cache server 220 at a different resource cache component 122 of a different CDN POP 120).

Each cache server 220 can include one or more tracking components, which may include hardware or software components for management of stored resources according to resource expiration data. The resource expiration data associated with a specific resource can be described as a time to live (e.g., a measured unit of time, based on a frequency of requests for the resource), after which the resource is deleted, is designated as stale, or the storage location corresponding to the expired resource is allowed to be overwritten.

In an embodiment, the one or more tracking components may allow the cache server 220 to assign resource expiration data, often referred to a time to live ("TTL"), to at least a portion of the resources maintained by the respective cache server 220. One skilled in the relevant art will appreciate that TTL can generally be utilize to establish time criteria that defines when resources are considered valid and returned by a cache server 220 to a requesting client. The one or more tracking components may also be utilized to monitor a residence time for resources that are currently maintained by the cache server 220 and available for being provided in response to content requests. Illustratively, cache servers 220 may associate different TTLs based on a relative position of the logical level within the cache server hierarchy and based, at least in part, on resource request parameters.

In certain embodiments, a service provider 106 can manage resource expiration data associated with the resources maintained in the cache server hierarchy as indicative of the popularity, or relative popularity, of the resource. In certain such embodiments, the management of the stored resources can be implemented in a manner such that the most frequently requested content (e.g., most popular resources) is available for processing by components optimized for performance. Additionally, less frequently request content can be distributed within the cache server hierarchy to less accessible portions of the cache server hierarchy. In the example of FIG. 2, cache servers 220' located at a relatively low position within the cache server hierarchy (e.g., cache level N of FIG. 2), can assign a relatively short time to life to their stored resources, while cache servers 220''' located at a relatively high position within the cache server hierarchy (e.g., cache level 1 of FIG. 2), can assign a relatively longer time to life to their stored resources. The cache servers 220 may further employ the assigned expiration data and monitored residence time in order to make expiration decisions regarding expiration of their stored resources (e.g., by deleting the resource from the cache server upon the residence time exceeding the assigned time to life). In this way, popular resources can be assigned shorter expiration data for the cache servers 220 at the lowest levels of the cache server hierarchy (e.g., the edge cache servers 220' which field resource requests). Additionally, resources can be assigned longer expiration data in successively higher levels of the cache server hierarchy.

The expiration data for a given resource may be reset by a resource cache component 118 when a request for that resource is received by that resource cache component 118 such that content will reside within the various cache servers 220 according to the frequency in which the content is requested by client devices 102. Less popular resources can migrate through the cache servers 220 of a cache server hierarchy as the expiration data expires unless subsequent requests for the resources are received. Thus, the expiration of the version of the resource has the effect of "pushing" the resource up the cache server hierarchy, in which the version of the resource is associated with longer expiration data. Subsequent requests for the resource at the edge cache servers 220' may then cause the edge cache servers 220' to request the resource from the cache servers 220 higher in the cache server hierarchy. Thus, more popular content may be maintained at the edge cache servers 220', as their expiration data may be frequently reset.

For example, upon the resource cache component 118 receiving a resource request, the edge cache server 220' maintains the requested resource for the established TTL, which is generally set to a lower amount. If the edge cache server 200' receives subsequent requests for the same resource (or substantially the same), the edge cache server 220' renew the TTL of the requested resource with every subsequent request, and can utilize the cache version of the resource in response to requested resource to the client device 102. Once TTL for a resource expires, the cached resource is considered "stale" and can be overwritten or otherwise designated as unusable by the edge cache server 220'. Accordingly, if the edge cache server 200' receives a subsequent request, the edge cache server 220' requests the resource from a parent cache server (e.g., one of the cache servers 220''). Should the requested resource not be available from the parent cache server 220'', further requests for the resource will be transmitted up the cache server hierarchy to other parent cache servers (e.g. one of the cache servers 220'''), or even to the origin server 112, until a computing device that maintains the requested resource in storage is found. Upon identification of the cache server 220 maintaining the requested resource, the residence time of the requested resource can be reset at an initial value on the cache server 220 in which the requested resource is found, and the requested resource can be propagated to hierarchically inferior or child cache server, each with the residence time of the requested resource reset at an initial value, and transmitted to the client device 102.

In certain embodiments, a client device request corresponding to a resource identifier can be generated by a client device 102 (e.g., in accordance with common network protocols), then received and processed by the content provider 104 to identify (e.g., in accordance with DNS routing principles) the appropriate responsive content and the CDN POP 116, 120, 124 associated with the appropriate CDN service provider 106 from which the responsive content may be obtained. For example, the CDN service provider 106 can provide the content provider 104 with an identification of applicable domains of the CDN service provider 106 (unless it has been previously provided) and any additional information. In turn, the content provider 104 can then process the information received from the CDN service provider 106 and can transmit appropriate information, including embedded resource identifiers, to the client device 102 making the request.

Upon receipt of the information from the content provider 104, the client device 102 can begin acquiring the resources identified by the embedded resource identifiers (e.g., using its local DNS resolver). For example, the edge cache server 220' of the selected resource cache component 118 can process the request by providing the requested resource if it is available. If the edge cache server 220' does not have a copy of the requested resource (e.g., owing to the expiration of the resource from the edge cache server 220' in accordance with the expiration data assigned to the resource), the edge cache server 220' can attempt to obtain the requested resource from another source (e.g., by sending a resource request to one or more hierarchically superior cache servers 220 of the resource cache component 118, to one or more hierarchically superior cache servers 220 of a different resource cache component 122, 126, or if the resource is also absent from these hierarchically superior cache servers 220, the origin server 112). More generally, if a cache server 220 of a resource cache component 118 does not have a copy of the requested resource, the cache server 220 can send a resource request to one or more hierarchically superior cache servers 220 of the same resource cache component 118, to one or more hierarchically superior cache servers 220 of a different resource cache component 122, 126, to the origin server 112, to a peer cache server 220 of the same resource cache component 118, to a peer cache server 220 of a different resource cache component 122, and to a hierarchically inferior cache server 220 at a different resource cache component 122. In certain embodiments, the resource requests can be sent from a cache server 220 in a first hierarchical level to one or more cache servers 220 that are in a second hierarchical level that is hierarchically adjacent to the first hierarchical level. In certain embodiments, the resource requests can be sent from a cache server 220 in a first hierarchical level to one or more cache servers 220 that are in a second hierarchical level that is not hierarchically adjacent to the first hierarchical level (which can be considered as jumping hierarchical levels, e.g., from an edge cache server 220' to the origin server 112).

In some configurations, each cache server 220 of a resource cache component 118 is constrained to only send resource requests to the hierarchically superior cache servers 220 of the same resource cache component 118. In such configurations which utilize availability information, or health information, the number of hierarchically superior cache servers 220 for each cache server 220 is relatively small, so each cache server 220 only accesses a relatively small amount of health information corresponding to the relatively small number of hierarchically superior cache servers 220. However, as described above, in certain embodiments, each cache server 220 of a resource cache component 118 is not constrained to only send resource requests to the hierarchically superior cache servers 220 of the same resource cache component 118, but can also send resource requests to the hierarchically superior cache servers 220 of other resource cache components 122, 126 of the CDN service provider 106. As a result, some of the cache servers 220 have a large number of hierarchically superior cache servers 220 available for resource requests across the entire CDN service provider 106, and the number of health checks and the amount of health information to be used can be correspondingly larger.

Figure 3:
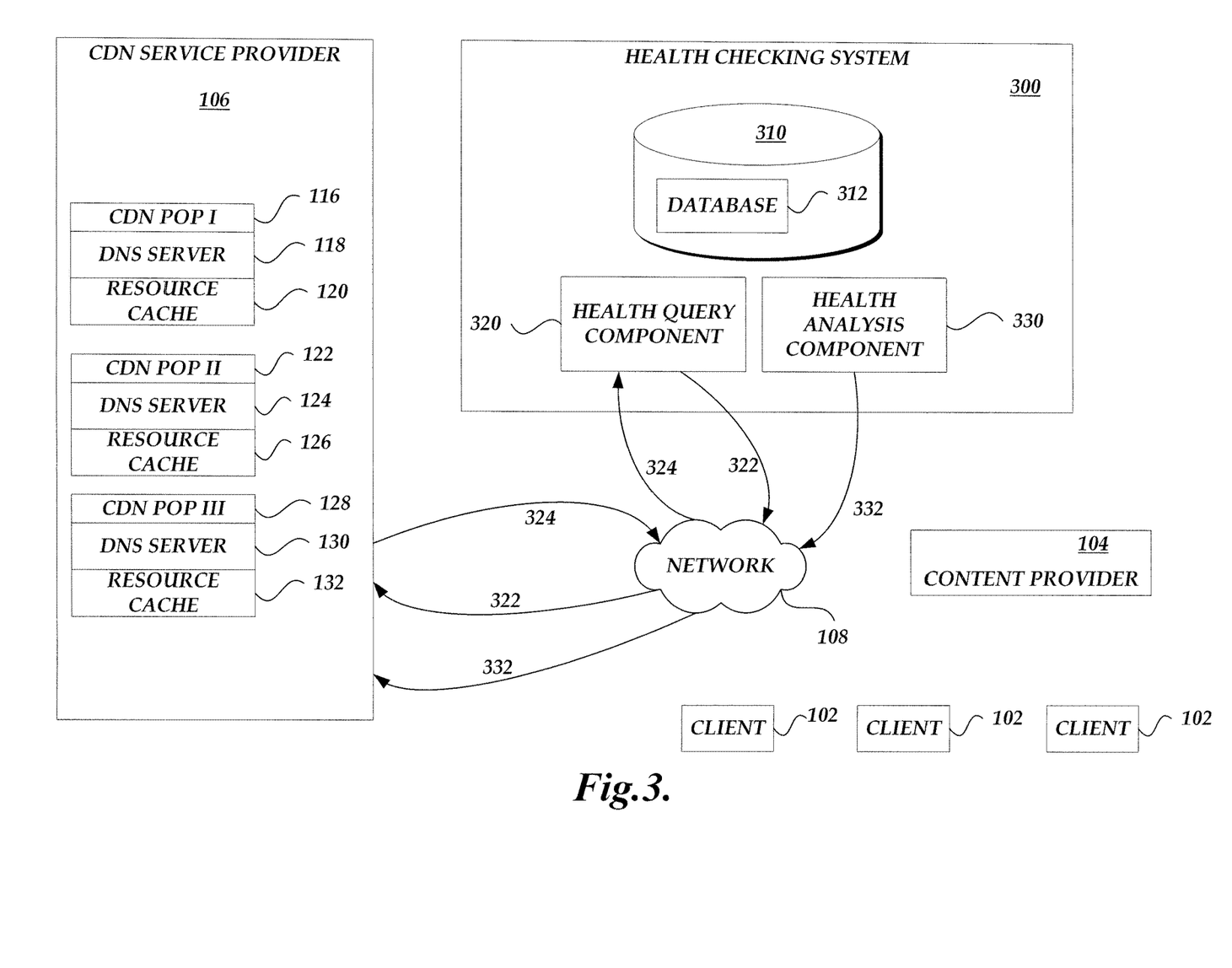
FIG. 3 schematically illustrates an availability checking system configured to be used in conjunction with a service provider (e.g., a CDN service provider) which is configured to communicate with one or more client devices and with a content provider in accordance with certain embodiments described herein.

FIG. 3 schematically illustrates an availability checking system 300 configured to be used in conjunction with a service provider (e.g., a CDN service provider 106) which is configured to communicate with one or more client devices 102 and with a content provider 104 in accordance with certain embodiments described herein. The availability checking system 300 includes a computer storage device 310 configured to store an availability data store 312 comprising a list of a plurality of potential endpoints of the service provider and a corresponding plurality of availability information for the plurality of potential endpoints. The availability checking system 300 further comprises a query component 320 operative to transmit a plurality of queries 322 (e.g., availability queries; health queries) to the plurality of potential endpoints and to receive a plurality of responses 324 (e.g., availability responses; health responses) from the plurality of potential endpoints. The availability checking system 300 further comprises an availability analysis component 330 operative to analyze the plurality of responses 324, to generate the plurality of availability information, and to update the availability data store 312. In certain embodiments, the availability analysis component 330 is further configured to transmit at least a portion of the updated availability data store 312 to the service provider.

The components of the availability checking system 300 (e.g., the storage device 310, the query component 320, and the availability analysis component 330) can be located within the content provider 104, within the CDN service provider 106 (e.g., within one of the CDN POPs 116, 120, 124 of the CDN service provider 106), or within a separate computing device configured to communicate with the CDN service provider 106 (e.g., as schematically illustrated by FIG. 3) and dedicated to providing a centralized capability for checking the availability (e.g., health) of the plurality of potential endpoints of the CDN service provider 106. The availability checking system 300 can comprise hardware (e.g., a server computing device), software (e.g., software configured to run on a server computing device), or both.

In certain embodiments, the computer storage device 310 can comprise a storage device of a server computing device. The computer storage device 310 can comprise permanent or semi-permanent storage integrated within the server computing device, or network accessible storage. In other embodiments, the computer storage device 310 can comprise removable or temporary storage.

The availability data store 312 comprises a list of potential endpoints of the service provider (e.g., the CDN service provider 106). In certain embodiments, the list of potential endpoints can represent the complete set of endpoints that potentially contain content to be retrieved in response to signals from the content provider 104. For example, the list can comprise a plurality of entries corresponding to each endpoint utilized to store content accessible to the content provider 104. Each entry of the list can comprise a network address for the endpoint or other information that uniquely identifies the endpoint. The potential endpoints can comprise the cache servers 220 (e.g., hosts, network interface controllers or NICs) of the various CDN POPs 116, 120, 124 of the CDN service provider 106. The potential endpoints in the list of potential endpoints can span multiple CDN POPs 116, 120, 124, PODs, or metro-sites.

The availability data store 312 further comprises a plurality of availability information corresponding to the listed plurality of potential endpoints. Each availability information entry in the database comprises information regarding the operational availability (e.g., health) of the particular endpoint to which the entry corresponds. For example, the availability information for each listed endpoint can comprise one or more of the following types of information: operational status of the endpoint; versions of the content stored by the endpoint (e.g., parcel versions); indication of whether the content stored by the endpoint is stale or not (e.g., beyond a predetermined threshold level); and quality of service (e.g., compression rates, processing power, processing speed, and/or bandwidth).

The query component 320 can be configured to transmit the plurality of queries 322 to the plurality of potential endpoints and to receive the plurality of responses 324 from the plurality of potential endpoints. For example, the query component 320 can transmit queries 322 via the network 108 to each endpoint of the plurality of potential endpoints (e.g., to the endpoints of the CDN service provider 106) and the requested information can be transmitted by the endpoints via the network 108 to the query component 320. The queries 322 can be transmitted over one or more application ports (e.g., over HTTP, FTP, etc.) and can be transmitted over the service ports of each cache layer.

Each potential endpoint can respond to a received query 322 by providing the requested information. The plurality of responses 324 comprises the requested information sent by the endpoints in response to the plurality of queries 322. The information requested by the queries 322 and contained in the responses 324 can include one or more of the following types of information: network address of the endpoint; other identification information regarding the endpoint; operational status of the endpoint; versions of the content stored by the endpoint (e.g., parcel versions); indication of whether the content stored by the endpoint is stale or not (e.g., beyond a predetermined threshold level); and quality of service (e.g., compression rates, processing power, processing speed, and/or bandwidth).

In certain embodiments, the query component 320 performs a discovery process by transmitting a first plurality of signals via the network 108 to the plurality of potential endpoints and receiving a corresponding second plurality of signals from the potential endpoints that are responsive to the first plurality of signals. In this way, the query component 320 effectively determines which endpoints are responsive to (e.g., "listening to") the availability checking system 300 thereby defining a list of endpoints that are identified to undergo further availability checking. For example, the first plurality of signals can be sent out at predetermined time intervals (e.g., every 20 minutes) to update the list of responsive endpoints. In certain embodiments, the discovery process is part of the availability checking process (e.g., the first plurality of signals and the queries 322 are the same as one another, and the second plurality of signals and the responses 324 are the same as one another). In certain other embodiments, the discovery process is separate from the availability checking process.

The query component 320 can be configured to transmit the plurality of queries 322 to the plurality of potential endpoints at predetermined times or at predetermined regular intervals (e.g., every 20 minutes). The potential endpoints may be parsed into predetermined subsets with the query component 320 probing the predetermined subsets of the potential endpoints sequentially (e.g., the queries 322 to one subset are sent substantially simultaneously with one another or within a predetermined time window with one another, and the queries 322 to other subsets are sent sequentially).

In certain embodiments, the availability analysis component 330 is operatively coupled to the query component 320 so that the availability analysis component 330 can access the plurality of responses 324 received from the plurality of potential endpoints. The availability analysis component 330 is configured to analyze the plurality of responses 324 and to generate the plurality of availability information corresponding to the plurality of potential endpoints. For example, the availability analysis component 330 can make a decision regarding the availability (e.g., health) of each endpoint of the plurality of possible endpoints (e.g., whether an endpoint is sufficiently healthy to be utilized in providing content). This decision can be made, in certain embodiments, by comparing the response 324 from the endpoint to a predetermined set of criteria indicative of an endpoint that is sufficiently healthy to be utilized in providing content. Depending on this comparison, the availability analysis component 330 can make a decision (e.g., a decision regarding whether the endpoint has failed or not failed) that is indicative of whether the endpoint should or should not be utilized in providing content. These decisions can be at least some of the plurality of availability information corresponding to the plurality of potential endpoints.

The availability analysis component 330 is further operatively coupled to the computer storage device 310 and configured to use the generated plurality of availability information to update the availability data store 312. In this way, the availability data store 312 comprises an up-to-date, centralized repository of availability information for the plurality of potential endpoints which may be utilized to provide content. In certain embodiments, the availability analysis component 330 is further configured to generate availability reports 332 and to transmit the availability reports 332 to the CDN service provider 106. The availability reports 332 can comprise information, based at least in part on the availability data store 312, relevant to the availability (e.g., health) of some or all of the endpoints of the plurality of potential endpoints. In certain embodiments, the availability analysis component 330 transmits (e.g., pushes) the availability reports 332 to the CDN service provider 106 at predetermined regular times or time intervals, with no prompting from the CDN service provider 106. In certain other embodiments, the availability analysis component 330 transmits the availability reports 332 to the CDN service provider upon receipt by the availability analysis component 330 of a request (e.g., fetch) for an availability report 332 from the CDN service provider 106.

At least some of the components of the CDN service provider 106 (e.g., the cache servers 220, the resource cache components 118, the request processing components 210) can be configured to utilize the availability reports 332 to determine which endpoints are to be accessed for content. For example, a cache server 220' can be seeking content to provide to a client 102 that the cache server 220' does not have, so the cache server 220' can send resource requests to other cache servers 220 (e.g., the hierarchically superior cache servers 220", 220'" of the same resource cache component 118, and to the hierarchically superior cache servers 220", 220'" of other resource cache components 122, 126 of the CDN service provider 106). However, using the information in the availability report 332, the cache server 220' can select to send the resource requests only to particular cache servers 220 (e.g., particular hierarchically superior cache servers 220", 220'") that are sufficiently healthy to utilized to provide content (e.g., thereby avoiding sending resource requests to cache servers 220 that are insufficiently healthy to be utilized to provide content). Thus, each cache server 220 knows which other cache servers 220 (e.g., hierarchically superior cache servers 220) from which to request content. In certain embodiments, the resource requests can be sent from a cache server 220 in a first hierarchical level to one or more cache servers 220 that are in a second hierarchical level that is not hierarchically adjacent to the first hierarchical level (which can be considered as jumping hierarchical levels, e.g., from an edge cache server 220' to the origin server 112).

Figure 4:
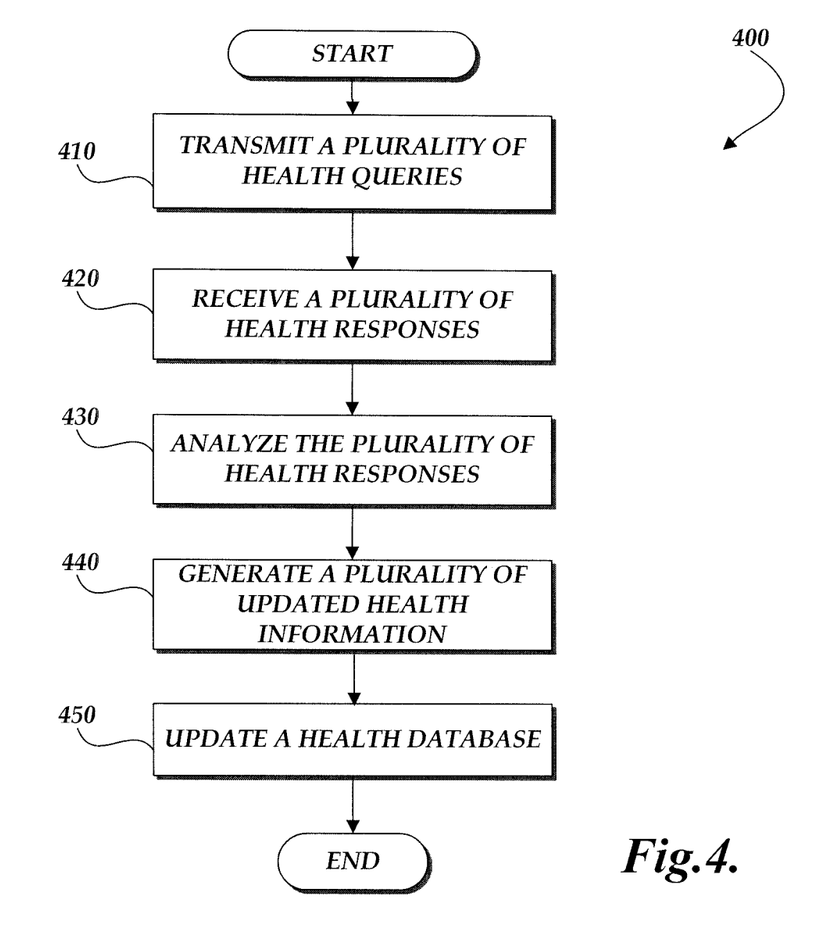
FIG. 4 is a flow diagram of an example computer implemented availability checking method for performing an availability check of a plurality of potential endpoints of a service provider compatible with certain embodiments described herein.

FIG. 4 is a flow diagram of an example computer implemented availability checking method 400 for performing an availability check of a plurality of potential endpoints of a service provider compatible with certain embodiments described herein. The service provider 106 (e.g., a CDN service provider) is configured to communicate with one or more client devices 102 and with a content provider 104. For example, as discussed herein, the plurality of potential endpoints to have their availability (e.g., health) checked can be determined by a discovery process by transmitting a first plurality of signals (e.g., via the network 108) to the endpoints of the service provider 106 and receiving a corresponding second plurality of signals from some or all of the endpoints that are responsive to the first plurality of signals.

In an operational block 410, the method 400 comprises transmitting a plurality of queries 322 (e.g., availability queries; health queries) to a plurality of potential endpoints of the service provider 106 (e.g., cache servers 220 of the CDN service provider 106). For example, as discussed herein, the plurality of queries 322 can be transmitted to the plurality of potential endpoints (e.g., via the network 108 over one or more application ports) to each endpoint of the plurality of potential endpoints (e.g., to the endpoints of the CDN service provider 106). The queries can correspond to indications of availability of the endpoints to process client requests. In certain embodiments, the plurality of queries 322 can comprise at least two subsets. For example, a first subset of the plurality of queries 322 (e.g., a discovery subset of the plurality of queries 322) can be transmitted at predetermined intervals (e.g., once every twenty minutes) to every endpoint (e.g., IP address) of which the availability checking system 300 is aware, and a second subset of the plurality of queries 322 (e.g., an availability subset of the plurality of queries 322) can be transmitted at predetermined intervals (e.g., once every three seconds) to every endpoint (e.g., IP address) which responded to a query 322 of the first subset of the plurality of queries 322.

In an operational block 420, the method 400 further comprises receiving a plurality of responses 324 (e.g., availability responses; health responses) transmitted from the plurality of potential endpoints in response to the plurality of queries 322. The plurality of responses 324 is indicative of the availability of the plurality of potential endpoints to process client requests. For example, as discussed herein, the received responses 324 can be transmitted (e.g., via the network 108) by the potential endpoints in response to the plurality of queries 322. In certain embodiments, the plurality of responses 324 can comprise at least two subsets. For example, a first subset of the plurality of responses 324 (e.g., a discovery subset of the plurality of responses 324) can be received from the endpoints which responded to the first subset of the plurality of queries 322, and a second subset of the plurality of responses 324 (e.g., an availability subset of the plurality of responses 324) can be received from the endpoints which responded to the second subset of the plurality of queries 322.

In an operational block 430, the method 400 further comprises analyzing the plurality of responses 324. For example, as described above, analyzing the plurality of responses 324 can comprise making a decision regarding the health of each endpoint of the plurality of possible endpoints (e.g., whether an endpoint is sufficiently healthy to be utilized in providing content). This decision can be made, in certain embodiments, by comparing the response 324 from the endpoint to a predetermined set of criteria indicative of an endpoint that is sufficiently healthy to be utilized in providing content. In certain embodiments, the first subset of the plurality of responses 324 can be analyzed by a discovery agent of the availability analysis component 330 to determine which endpoints are responsive to the first subset of the plurality of queries 322, and the second subset of the plurality of responses 324 can be analyzed by an availability agent of the availability analysis component 330 to determine the health of each endpoint which was responsive to the first subset of the plurality of queries 322. For example, the availability checking system 300 can learn the identity of an endpoint from a first portion of a response (e.g., in a first line of XML of the response), then can inspect the remaining portion of the response (e.g., subsequent lines of XML of the response) to learn one or more of the following: the various versions of content known by the endpoint, the cache server status, information about the connectivity of the endpoint (e.g., "next-hop-group-id" containing its gateway address), and information about deeper health checks that had been performed locally on the endpoint (e.g., "healthy-at" and "healthy-peers"). An example format of a response 324 to a query 322 in accordance with certain embodiments described herein is as follows:

squid:EdgeSquidL1-edge-cache-154.e-dub2/0
<health><healthy-at>Thu Oct 23 19:49:10 2014 GMT</healthy-at><vip-list-version>920583</vip-list-version><credential-version>100644</credential-version><throttling-limits-version>106514</throttling-limits-version><server-status>OK<server-status><healthy-peers>2</healthy-peers><invalidation-version>13152885</invalidation-version><clbviphosterstate-version>115546535<clbviphosterstate-version><hostmapping-version>14378007</hostmapping-version><next-hop-group-id>216.137.56.1</next-hop-group-id></health>

To determine if an endpoint is healthy, the availability analysis component 330 can check for an HTTP response code of "200 OK", a server status value of "OK", a healthy-at timestamp within a predetermined time period (e.g., within the last 30 seconds), and versions at or above the expected values.

In an operational block 440, the method 400 further comprises generating a plurality of updated availability information. For example, as described herein, analyzing the plurality of responses 324 can result in decisions at least some of which are included in the plurality of updated availability information corresponding to the plurality of potential endpoints.

In an operational block 450, the method 400 further comprises updating an availability data store using the plurality of updated availability information. The availability data store comprises a list of the plurality of potential endpoints of the service provider 106 and a corresponding plurality of availability information for the plurality of potential endpoints.

Certain embodiments described herein advantageously provide each endpoint (e.g., each cache server 220) of the service provider 106 with availability (e.g., health) information regarding the other endpoints from which the endpoint can request content, so the endpoint knows which other endpoints to cache content from. For example, the endpoint can utilize the availability information to route around unhealthy endpoints. In certain embodiments, the information of the centralized availability data store 312 can be used to monitor the overall performance of the service provider 106. For example, if the updated availability data store 312 indicates that more than a predetermined threshold number of endpoints are under a failure condition, the availability checking system 300 can activate an alarm or other indicator that notifies operators of the system of the large number of failures and to begin troubleshooting.

In certain embodiments, the centralized availability data store 312 can provide useful information to facilitate such troubleshooting. In certain embodiments, the centralized availability data store 312 includes information regarding the version numbers of particular content in the various cache servers 220 of the service provider 106. This information can be used to monitor progress of applications in reporting these version numbers. If the reporting time for an application exceeds a predetermined threshold (e.g., 15 minutes), the application on a particular cache server 220 can be reported as having failed. In certain embodiments, some or all of the availability information can be provided to the content provider 104 to allow the content provider 104 to judge the overall health of the service provider 106.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented availability checking system configured to be used in conjunction with a service provider which is configured to communicate with one or more client devices and with a content provider, the availability checking system comprising:

a computer storage device operative to store an availability data store comprising a list of a plurality of potential endpoints of the service provider and a corresponding plurality of availability information for the plurality of potential endpoints, wherein the plurality of potential endpoints are distributed across a plurality of resource cache components;

an availability query portion of a server computing device, the availability query portion operative to transmit a plurality of queries to the plurality of potential endpoints and to receive a plurality of responses from the plurality of potential endpoints, the plurality of responses in response to the plurality of queries, wherein a response received from a potential endpoint comprises one or more of the following: versions of content stored by the endpoint to be requested by the one or more client devices, and indication of whether the content stored by the endpoint to be requested by the one or more client devices is stale or not; and an availability analysis portion of the server computing device, the availability analysis portion operative to analyze the plurality of responses, to generate the plurality of availability information, and to update the availability data store, wherein the availability checking system communicates report information to the service provider, the report information based at least in part on the availability data store and indicative of which endpoints are to be accessed for content.

2. The computer implemented availability checking system of claim 1, wherein each endpoint of a resource cache component is configured to send resource requests to hierarchically superior endpoints of the resource cache component and to hierarchically superior endpoints of other resource cache components.

3. The computer implemented availability checking system of claim 1, wherein the response received from a potential endpoint further comprises one or more of the following: one or more network addresses of the endpoint, identification of the endpoint, operational status of the endpoint, and quality of service.

4. The computer implemented availability checking system of claim 1, wherein the availability analysis portion is configured to make a decision regarding the availability of each endpoint of the plurality of potential endpoints by comparing the response from the endpoint to a predetermined set of criteria indicative of an endpoint that is sufficiently healthy to be utilized in providing content.

5. The computer implemented availability checking system of claim 1, wherein each endpoint of the resource cache component is further configured to not send resource requests to peer endpoints of either the resource cache component or to peer endpoints of other resource cache components.

6. The computer implemented availability checking system of claim 5, wherein each endpoint of the resource cache component is further configured to not send resource requests to hierarchically inferior endpoints of either the resource cache component or to hierarchically inferior endpoints of other resource cache components.

7. A computer implemented method for performing a check of a service provider which is configured to communicate with one or more client devices and with a content provider, the method comprising:
   transmitting a plurality of queries to a plurality of potential endpoints of a service provider, the queries corresponding to indications of availability of the endpoints to process client requests;
   receiving a plurality of responses transmitted from the plurality of potential endpoints in response to the plurality of queries, the plurality of responses indicative of the availability of the endpoints to process client requests, wherein a response received from a potential endpoint comprises one or more of the following: versions of content stored by the endpoint to be requested by the one or more client devices, and indication of whether the content stored by the endpoint to be requested by the one or more client devices is stale or not;
   analyzing the plurality of responses;
   generating a plurality of updated availability information;
   updating an availability data store using the plurality of updated availability information; and
   communicating report information to the service provider, the report information based at least in part on the availability data store and indicative of which endpoints are to be accessed for content.

8. The computer implemented method of claim 7, wherein the plurality of potential endpoints are distributed across a plurality of resource cache components and wherein each endpoint of a resource cache component is configured to send resource requests to hierarchically superior endpoints of the resource cache component and to hierarchically superior endpoints of other resource cache components.

9. The computer implemented method of claim 7, wherein each endpoint of the resource cache component is further configured to not send resource requests to peer endpoints of either the resource cache component or to peer endpoints of other resource cache components.

10. The computer implemented method of claim 9, wherein each endpoint of the resource cache component is further configured to not send resource requests to hierarchically inferior endpoints of either the resource cache component or to hierarchically inferior endpoints of other resource cache components.

11. The computer implemented method of claim 7, wherein the received responses from an endpoint further comprise one or more of the following: one or more network addresses of the endpoint, identification of the endpoint, operational status of the endpoint, and quality of service.

12. The computer implemented method of claim 7, wherein analyzing the plurality of responses comprises making decisions regarding the health of each endpoint of the plurality of potential endpoints by comparing the response from the endpoint to a predetermined set of criteria indicative of an endpoint that is sufficiently healthy to be utilized in providing content.

13. A non-transitory computer storage having stored thereon instructions that, when executed by a computer system configured to communicate with one or more client devices and with a content provider, cause the computer system to:
   transmit a plurality of queries to a plurality of potential endpoints of a service provider, the queries corresponding to indications of availability of the endpoints to process client requests;
   receive a plurality of responses transmitted from the plurality of potential endpoints in response to the plurality of queries, the plurality of responses indicative of the availability of the endpoints to process client requests, wherein a response received from a potential endpoint comprises one or more of the following: versions of content stored by the endpoint to be requested by the one or more client devices, and indication of whether the content stored by the endpoint to be requested by the one or more client devices is stale or not;
   analyze the plurality of responses;
   generate a plurality of updated availability information;
   update an availability data store using the plurality of updated availability information; and
   communicate report information to the service provider, the report information based at least in part on the availability data store and indicative of which endpoints are to be accessed for content.

14. The non-transitory computer storage of claim 13, wherein the plurality of potential endpoints are distributed across a plurality of resource cache components and wherein each endpoint of a resource cache component is configured to send resource requests to hierarchically superior endpoints of the resource cache component and to hierarchically superior endpoints of other resource cache components.

15. The non-transitory computer storage of claim 13, wherein each endpoint of the resource cache component is further configured to not send resource requests to peer endpoints of either the resource cache component or to peer endpoints of other resource cache components.

16. The non-transitory computer storage of claim 15, wherein each endpoint of the resource cache component is further configured to not send resource requests to hierarchically inferior endpoints of either the resource cache component or to hierarchically inferior endpoints of other resource cache components.

17. The non-transitory computer storage of claim 13, wherein the received responses from an endpoint further comprise one or more of the following: one or more network addresses of the endpoint, identification of the endpoint, operational status of the endpoint, and quality of service.

18. The non-transitory computer storage of claim 13, wherein the computer system analyzing the plurality of responses comprises making decisions regarding the health of each endpoint of the plurality of potential endpoints by comparing the response from the endpoint to a predetermined set of criteria indicative of an endpoint that is sufficiently healthy to be utilized in providing content.

* * * * *